United States Patent
Liu

(10) Patent No.: US 11,025,769 B2
(45) Date of Patent: Jun. 1, 2021

(54) TERMINAL MANAGEMENT METHOD AND DEVICE, TERMINAL AND COMPUTER STORAGE MEDIUM

(71) Applicant: ZTE CORPORATION, Guangdong (CN)

(72) Inventor: Zhengrong Liu, Guangdong (CN)

(73) Assignee: ZTE CORPORATION, Guangdong (CN)

( * ) Notice: Subject to any disclaimer, the term of this patent is extended or adjusted under 35 U.S.C. 154(b) by 0 days.

(21) Appl. No.: 16/959,639

(22) PCT Filed: Jun. 24, 2019

(86) PCT No.: PCT/CN2019/092520
§ 371 (c)(1),
(2) Date: Jul. 1, 2020

(87) PCT Pub. No.: WO2020/034762
PCT Pub. Date: Feb. 20, 2020

(65) Prior Publication Data
US 2020/0344349 A1     Oct. 29, 2020

(30) Foreign Application Priority Data
Aug. 17, 2018   (CN) .......................... 201810938437.8

(51) Int. Cl.
*H04M 1/72454* (2021.01)
*H04M 1/72457* (2021.01)
*H04M 1/72463* (2021.01)

(52) U.S. Cl.
CPC ... *H04M 1/72454* (2021.01); *H04M 1/72457* (2021.01); *H04M 1/72463* (2021.01)

(58) Field of Classification Search
CPC ....... H04L 63/20; H04L 63/101; H04W 12/08
See application file for complete search history.

(56) References Cited

U.S. PATENT DOCUMENTS 6,021,438 A * 2/2000 Duvvoori .............. G06F 21/105
                                                            709/224
8,793,703 B2   7/2014 Sugaya
(Continued)

FOREIGN PATENT DOCUMENTS

CN     103416040 A     11/2013
CN     103647785 A      3/2014
(Continued)

OTHER PUBLICATIONS

WIPO, International Search Report dated Aug. 15, 2019.

*Primary Examiner* — Joshua L Schwartz
(74) *Attorney, Agent, or Firm* — Li & Cai Intellectual Property (USA) Office

(57) ABSTRACT

Embodiments of the present disclosure provide a terminal management method and device, a terminal and a computer storage medium. The terminal management method comprises: obtaining current environment information of a terminal; determining an application management strategy matching with the current environment information according to the current environment information and a correspondence between environment information and application management strategies; and performing an enabling management on an application program set in the terminal according to the application management strategy.

15 Claims, 6 Drawing Sheets

(56) References Cited

U.S. PATENT DOCUMENTS

| | | | |
|---|---|---|---|
| 10,250,739 B2 | 4/2019 | Cheng | |
| 2008/0316983 A1 | 12/2008 | Daigle | |
| 2011/0202433 A1* | 8/2011 | Yokoyama | G06F 21/105 |
| | | | 705/28 |
| 2014/0108491 A1 | 4/2014 | Fan et al. | |
| 2019/0014152 A1* | 1/2019 | Verma | H04W 12/08 |

FOREIGN PATENT DOCUMENTS

| | | |
|---|---|---|
| CN | 103885671 A | 6/2014 |
| CN | 105094962 A | 11/2015 |
| CN | 105451217 A | 3/2016 |
| CN | 107465662 A | 12/2017 |
| KR | 20180060751 A | 6/2018 |

* cited by examiner

TERMINAL MANAGEMENT METHOD AND DEVICE, TERMINAL AND COMPUTER STORAGE MEDIUM

CROSS-REFERENCE TO RELATED APPLICATION

This is a National Phase Application filed under 3 U.S.C. 371 as a national stage of International Application No. PCT/CN2019/092520, filed on Jun. 24, 2019 which is hereby incorporated by reference in its entirety.

FIELD

The present disclosure relates to but not limited to the technical field of terminals.

BACKGROUND

The mobile phone terminals have become an indispensable tool in people's daily lives. Many people are becoming more and more dependent on the mobile phone terminals, and even they have to look at the mobile phone terminals all the time, so that the improper use of the terminals brings about some negative effects, for example, the people play mobile phones while walking, which leads to the distraction and thus many accidents, causing a lot of harm to the body. Furthermore, in some public places, the user uses certain functions that cannot be used in the terminal, for example, the user uses the photographing function in certain occasions where the photographing is prohibited.

Although individual countries prohibit similar behaviors through laws and regulations and use signs to make prompts, but the effect is very limited when the use of terminals is regulated by only relying on the restrictions of regulations and the consciousness of users.

SUMMARY

According to an aspect of the embodiments of the present disclosure, a terminal management method is provided, which includes: obtaining the current environment information of a terminal; determining an application management strategy matching with the current environment information according to the current environment information and a correspondence between environment information and application management strategies; and performing an enabling management on an application program set in the terminal according to the application management strategy.

According to another aspect of the embodiments of the present disclosure, a terminal management device is provided, which includes: an obtaining module configured to obtain the current environment information of a terminal; a determining module configured to determine an application management strategy matching with the current environment information according to the current environment information and a correspondence between environment information and application management strategies; and an enabling management module configured to perform an enabling management on an application program set in the terminal according to the application management strategy.

According to yet another aspect of the embodiments of the present disclosure, a terminal is provided, which includes a processor and a memory for storing a computer program runable on the processor, wherein the processor performs the terminal management method of the present disclosure when running the computer program.

According to yet another aspect of the embodiments of the present disclosure, a computer storage medium is provided, where the computer readable storage medium stores a computer program thereon, and when the computer program is executed by a processor, the processor performs the terminal management method according to the present disclosure.

DETAILED DESCRIPTION OF THE EMBODIMENTS

In order to make the purposes, technical solutions and advantages of the present disclosure clearer, the specific technical solutions of the present disclosure will be further described in detail below in combination with the drawings in the embodiments of the present disclosure. The following embodiments are used to illustrate the present disclosure, but not used to limit the scope of the present disclosure.

With the development of terminal technology, the improper use of terminals by the people has also caused many negative problems, and the effect is very limited when the use of terminals is regulated by only relying on the restrictions of regulations and the consciousness of users. In order to solve the above problems, if the terminals are completely disabled in some particular places, it will cause that some necessary functions such as real-time positioning function cannot be used; if the users selectively close or open the particular applications, the manual operations of the users will be increased, and these will bring the inconvenience to the users and reduce the user experience.

Figure 1:
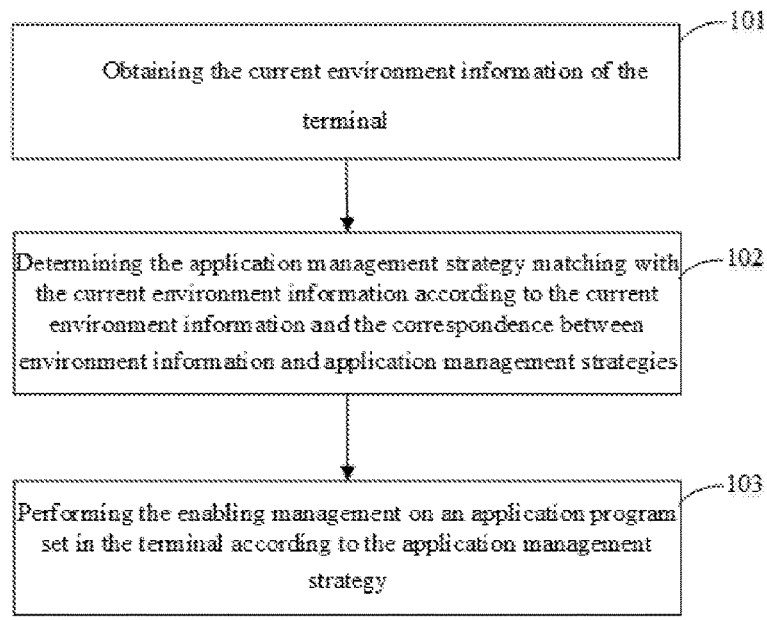
FIG. 1 is a flow schematic diagram of a terminal management method according to an embodiment of the present disclosure.

An embodiment of the present disclosure provides a terminal management method, which may be applied to a terminal, including but not limited to a tablet device, a personal digital processor, a mobile terminal, a smart wearable device, and the like. As shown in FIG. 1, the terminal management method may include steps 101 to 103.

In step 101, the current environment information of the terminal is obtained.

Here, the current environment information includes one or more of various types of parameters. Various types of parameters include but not limited to motion state parameter, location parameter, ambient brightness parameter, time parameter, etc.

In the following, the current environment information includes the motion state parameter as an example for description. The motion state parameter refers to a relevant parameter that can characterize the motion state of the terminal, and the motion state of the terminal can characterize the motion state of the user corresponding to the terminal. The motion state may include but not limited to: stationary state, walking state, running state, and the like.

According to an embodiment provided by the present disclosure, the motion state parameter may be measured by an inertial sensor in the terminal, wherein the inertial sensor may include a gravity sensor and/or a gyroscope; and the motion state parameter may also be measured by a navigation system including a short-range positioning system and a satellite positioning system, so that the terminal may accurately measure the motion state of the terminal through a variety of motion state measurement devices. For example, the terminal uses the inertial sensor data and derives from the navigation formula to obtain the speed information of the terminal in each direction of the coordinate system, i.e., the motion state parameter.

In step 102, the application management strategy matching with the current environment information is determined according to the current environment information and the correspondence between environment information and application management strategies.

Here, the correspondence between environment information and application management strategies may refer to a condition that the environment information of the terminal corresponding to the application management strategy needs to meet, wherein the condition may be expressed based on the motion state parameter. For example, the current motion state parameter of the terminal is 2 m/s. In the correspondence between environment information and application management strategies, the motion state parameter corresponding to the environment 1 is 0.1 m/s-5 m/s, and the environment 1 corresponds to the application management strategy 1, so as to determine that the current motion state parameter of the terminal belongs to the environment 1, and determine the corresponding application management strategy as the application management strategy 1.

According to an embodiment provided by the present disclosure, in the correspondence between environment information and application management strategies, the environment information may be configured as a functional parameter accordingly. The functional parameter refers to the state type, for example, the state type is slow walking state, stationary state, running state, or the like. For example, the state type corresponding to the environment 1 is the walking state, and the environment 1 corresponds to the application management strategy 1; the state type corresponding to the environment 2 is the stationary state, and the environment 2 corresponds to the application management strategy 2; the state type corresponding to the environment 3 is the running state, and the environment 3 corresponds to the application management strategy 3; and so on.

According to an embodiment provided by the present disclosure, in the correspondence between environment information and application management strategies, the environment information may also be configured as a numeric parameter. The numeric parameter refers to the operating state parameter values corresponding to different state types, for example, the motion state parameter value is 0.1 m/s-5 m/s, 5 m/s-15 m/s, 15 m/s-X m/s or the like. The motion state parameter value corresponding to the environment 1 is 0.1 m/s-5 m/s, and the environment 1 corresponds to the application management strategy 1; the motion state parameter value corresponding to the environment 2 is 5 m/s-15 m/s, and the environment 2 corresponds to the application management strategy 2; the motion state parameter value corresponding to the environment 3 is 15 m/s-X m/s, and the environment 3 corresponds to the application management strategy 3; and so on.

According to an embodiment provided by the present disclosure, if the environment information in the correspondence between environment information and application management strategies is a functional parameter, there is a need to search for the numeric parameter corresponding to the environment information in the parameters preset by the terminal, and compare the current environment information with the found numeric parameter to determine the corresponding state type. For example, if the motion state parameter in the correspondence between environment information and application management strategies is "slow walking", it is possible to query the preset parameters of the terminal for the fact that the numeric parameter range corresponding to "slow walking" is 0.1 m/s-5 m/s.

Figure 2:
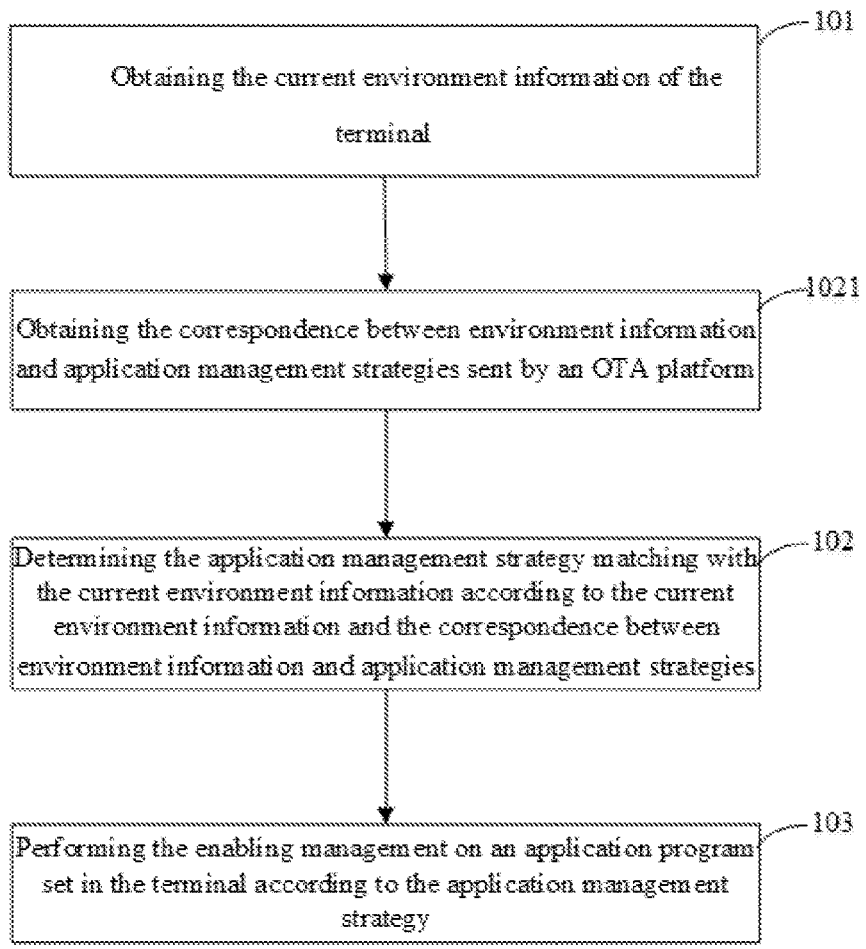
FIG. 2 is another flow schematic diagram of a terminal management method according to an embodiment of the present disclosure.

In an embodiment provided by the present disclosure, as shown in FIG. 2, before step 102, the method may further include step 1021: obtaining the correspondence between environment information and application management strategies sent by an Over The Air (OTA) platform. That is to say, the correspondence between environment information and application management strategies may be sent by the operator or security agency to the terminal through the OTA platform. However, this embodiment is not limited here. As an alternative, the correspondence between environment information and application management strategies may also be obtained by short message, multimedia message or another similar method. If the short message, multimedia message or another method is used, the terminal further needs to parse the information content after receiving the short message or multimedia message.

Operators or security agencies uniformly set the correspondence between environment information and application management strategies according to the laws and regulations, and then the operators or security agencies uniformly publish and optimize the correspondence between terminal environment information and application management strategies, to thereby regulate the use of the terminals by the people uniformly and reasonably. In addition, it should be noted that the operators or security agencies may further update the correspondence between environment information and application management strategies according to the actual demands. It should be noted that the application management strategy may be sent by the OTA platform or preset in the terminal.

Figure 3:
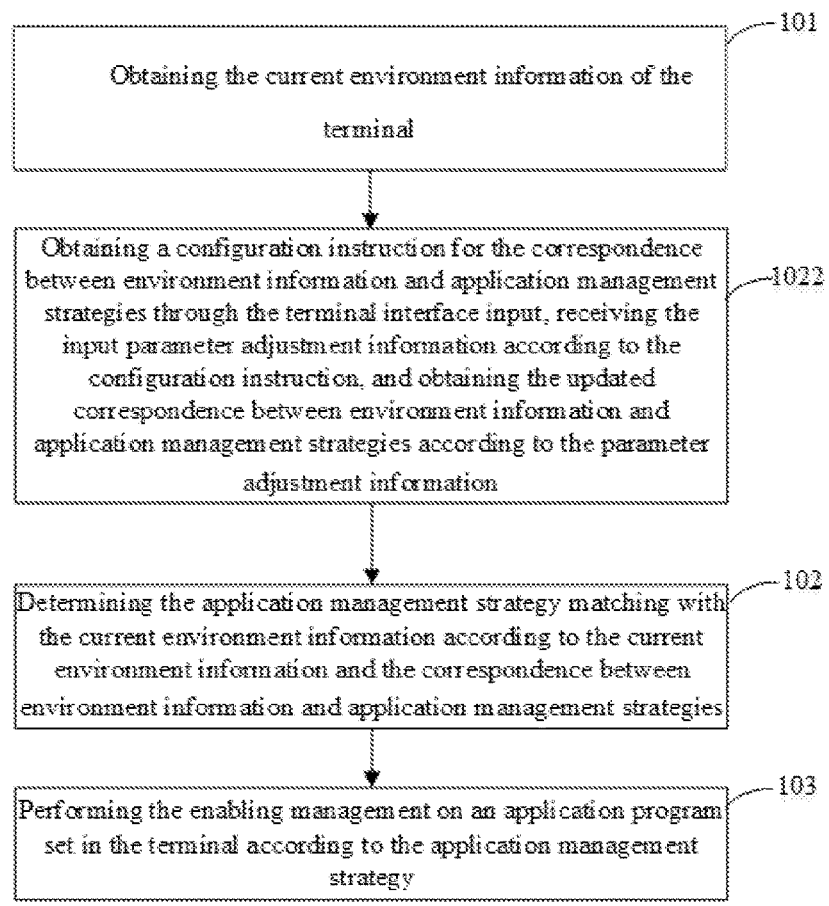
FIG. 3 is yet another flow schematic diagram of a terminal management method according to an embodiment of the present disclosure.

In an embodiment provided by the present disclosure, the user may also adjust the correspondence between environment information and application management strategies according to his own demand. As shown in FIG. 3, before step 102, the method may further include step 1022. In step 1022, a configuration instruction for the correspondence between environment information and application management strategies is obtained through the terminal interface input, the input parameter adjustment information is received according to the configuration instruction, and the updated correspondence between environment information and application management strategies is obtained according to the parameter adjustment information.

That is to say, the configuration using the interface input mode can allow the user to perform the flexible configuration according to the actual situation and demand, improving the user experience. The enable mode of the application program is configured by the user. Before deciding to perform the enable mode, it is possible to query whether to enter the enable mode and then perform, or it is possible to choose the no-query mode and enter the enable mode automatically.

In step 103, the enabling management is performed on an application program set in the terminal according to the application management strategy.

In an embodiment provided by the present disclosure, the step 103 may include: determining that the application program is permitted to be used or prohibited from being used according to the application management strategy.

For example, if it is stipulated that only three application functions, i.e., time, emergency call, and answering call, are allowed when walking, the environment information and the application management strategy are configured accordingly. The state type corresponding to the environment 1 is walking, and in the application management strategy 1 corresponding to the environment 1, the application programs permitted to be used include time, emergency call, and answering call, while other application programs are all the restricted application programs. When the detected motion state parameter of the terminal is 0.1 m/s to 5 m/s, it may be determined that the user is in the environment 1, i.e., slow walking state, so that the corresponding application management strategy 1 may be determined, and the enabling management is performed on the terminal according to the application management strategy 1, so that the terminal can only use the functions of time, emergency call and answering call.

In an embodiment provided by the present disclosure, the corresponding application management strategy is matched out according to the comparison result between the environment information detected by the terminal and the preset corresponding parameter value, and each application program is determined to be prohibited from being used or permitted to be used according to the application strategy, so that the terminal judges its own use environment automatically, and judges whether each application program of the terminal is prohibited from being used or permitted to be used respectively according to its own use environment, thereby achieving the purpose of regulating the user to use the terminal reasonably and safely.

Figure 4:
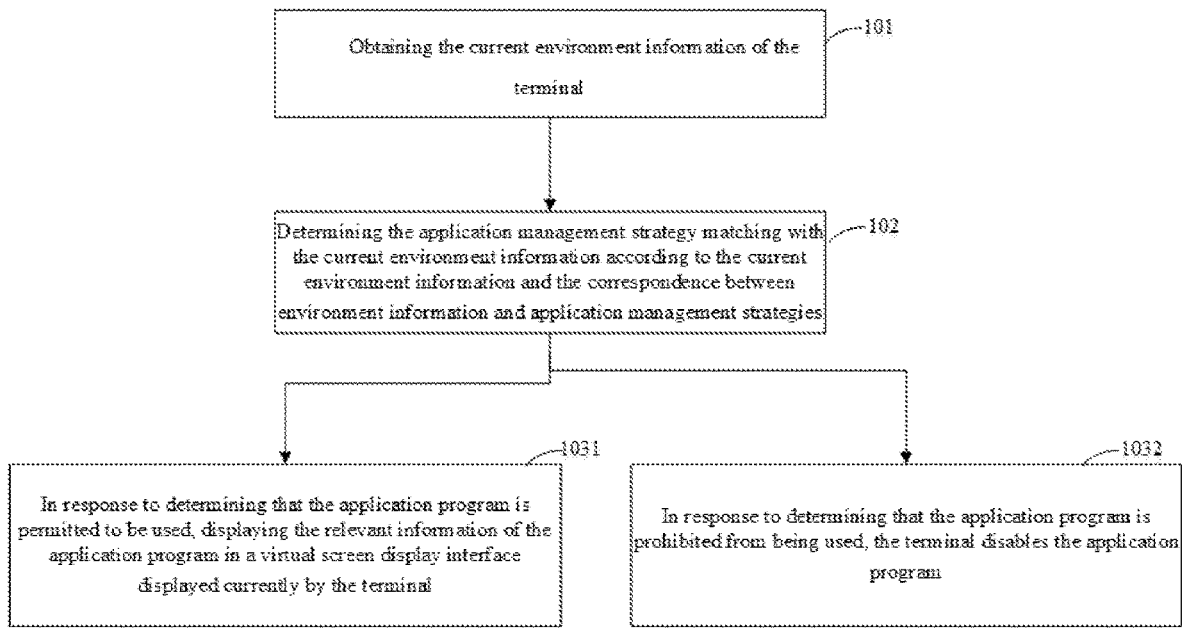
FIG. 4 is yet another flow schematic diagram of a terminal management method according to an embodiment of the present disclosure.

In an embodiment provided by the present disclosure, as shown in FIG. 4, the step 103 may include step 1031 and step 1032.

In step 1031, in response to determining that the application program is permitted to be used, the relevant information of the application program is displayed in a virtual screen display interface displayed currently by the terminal, wherein the virtual screen display interface is a user interface locked and displayed currently by the terminal.

In step 1032, in response to determining that the application program is prohibited from being used, the terminal disables the application program.

Figure 5:
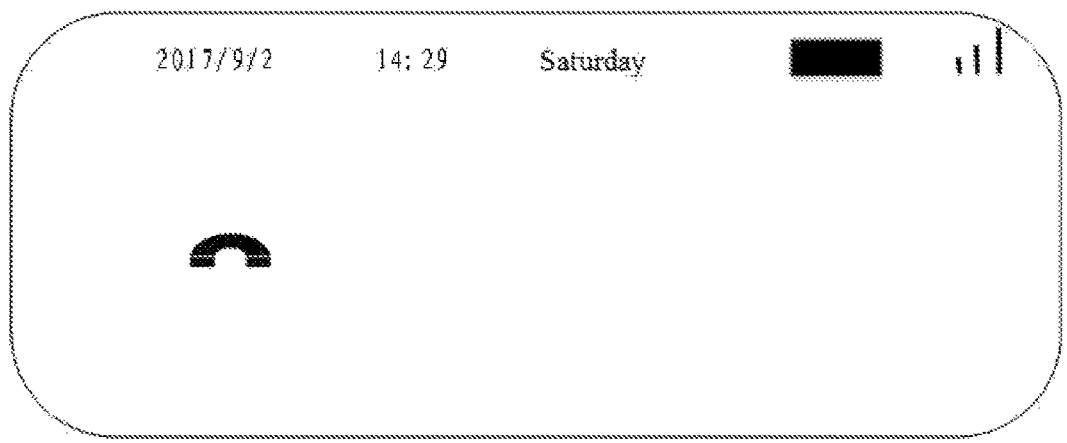
FIG. 5 is a schematic diagram of a virtual screen display interface managed by a terminal according to an embodiment of the present disclosure.

For example, when the terminal enables the terminal management mode, the user interface of the terminal locks and displays the virtual screen display interface, and the virtual screen display interface may display the relevant information of the application programs permitted to be used, e.g., interface identifier information. The positions of the interface identifiers of the application programs permitted to be used are different from each other, and the virtual screen display interface of the terminal may be as shown in FIG. 5. In an embodiment provided by the present disclosure, the virtual screen display interface may also display the prompt information, e.g., "functions are restricted, pay attention to safety", "prohibit from looking at phone when walking in \*\*\* area" and other prompt information.

In an embodiment provided by the present disclosure, the terminal uses the virtual screen display interface to display the information of the application programs that are permitted to be used, shielding the disabled application programs, letting the user know that the terminal has entered the restricted state, and also reducing the power consumption of the terminal.

Figure 6:
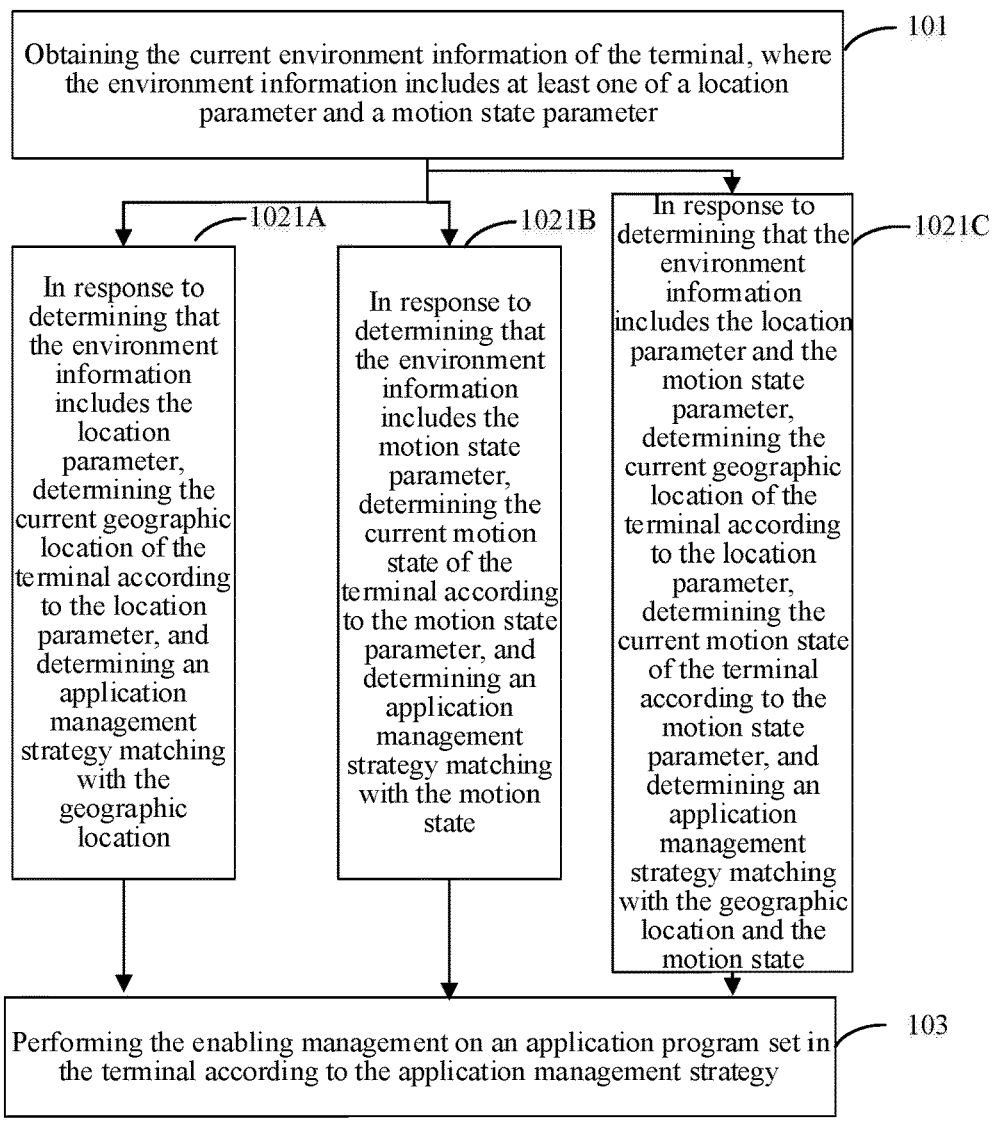
FIG. 6 is a flow schematic diagram of a terminal management method according to an embodiment of the present disclosure.

In an embodiment provided by the present disclosure, the environment information includes at least one of a location parameter and a motion state parameter. As shown in FIG. 6, the step 102 may include steps 1021A to 1021C.

In step 1021A, in response to determining that the environment information includes the location parameter, the current geographic location of the terminal is determined according to the location parameter, and an application management strategy matching with the current geographic location is determined.

In step 1021B, in response to determining that the environment information includes the motion state parameter, the current motion state of the terminal is determined according to the motion state parameter, and an application management strategy matching with the current motion state is determined.

In step 1021C, in response to determining that the environment information includes the location parameter and the motion state parameter, the current geographic location of the terminal is determined according to the location parameter, the current motion state of the terminal is determined according to the motion state parameter, and an application management strategy matching with the current geographic location and the current motion state is determined.

Here, the methods of obtaining the location parameter may include multiple types, and may include (but not limited to) one or more of base station code, wireless network name, or satellite positioning for obtaining the location parameter. The location area divided based on the base station code is a relatively ambiguous location parameter with an approximate range. The location area divided based on the wireless network name (i.e., WiFi SSID) is also a relatively ambiguous location parameter with an approximate range, which is suitable for the situation where the terminal is indoor. The parameter obtained based on the satellite positioning is a relatively precise location parameter, which is suitable for the situation where the terminal is outdoor.

The electronic map may be used to judge whether the current location parameter of the terminal satisfies the location parameter range in the correspondence between environment information and application management strategies. For example, if it is desired to determine whether the current geographic location of the terminal is within the geographical range of a city, the geographic fence data of the city may be determined by the electronic fence function of the electronic map. If it is determined that the current location parameter of the terminal is within the range of the geographic fence data, the current geographic location of the terminal is determined to be within the geographical range of the city.

For example, when the user enters a research institute, he can only use the time and emergency call application functions of the mobile phone, and then the environment 1 in the environment and the application management strategy may be configured accordingly, where the environment 1 contains the geographic location being the research institute, and the application programs permitted to be used in the application management strategy 1 corresponding to the environment 1 include time and emergency call, while other applications are all disabled. When detecting that the current environment of the terminal is in the research institute, it is determined that the user is in the state corresponding to the environment 1, to thereby determine the corresponding application management strategy 1 and perform the enabling management on the terminal according to the application management strategy 1, where the terminal can only use the time and answering call functions.

In an embodiment provided by the present disclosure, the preset condition of the application management strategy may be determined according to the geographic location information, so that when the user enters a specific place, the terminal can automatically perform the enabling management on the application programs according to the location of the terminal, to thereby regulate the use of the terminal by the user.

As another example, when the user is running in a park, he can only use the time and answering call application functions of the mobile phone, and then the environment 1 in the environment and the application management strategy may be configured accordingly, where the environment 1 contains the motion state type being running and the geographic location being the park, and the application programs permitted to be used in the application management strategy 1 corresponding to the environment 1 include time and emergency call, while other application programs are all disabled. When detecting that the current environment of the terminal is in the park and the motion state is running, it is determined that the user is in the state corresponding to the environment 1, to thereby determine the corresponding application management strategy 1 and perform the enabling management on the terminal according to the application management strategy 1, where the terminal can only use the time and answering call functions.

In an embodiment provided by the present disclosure, the location information and the motion state information are used to jointly determine the corresponding application management strategy, which can further accurately detect the usage scenario of the terminal and improve the accuracy of the enabling management of application programs.

Figure 7:
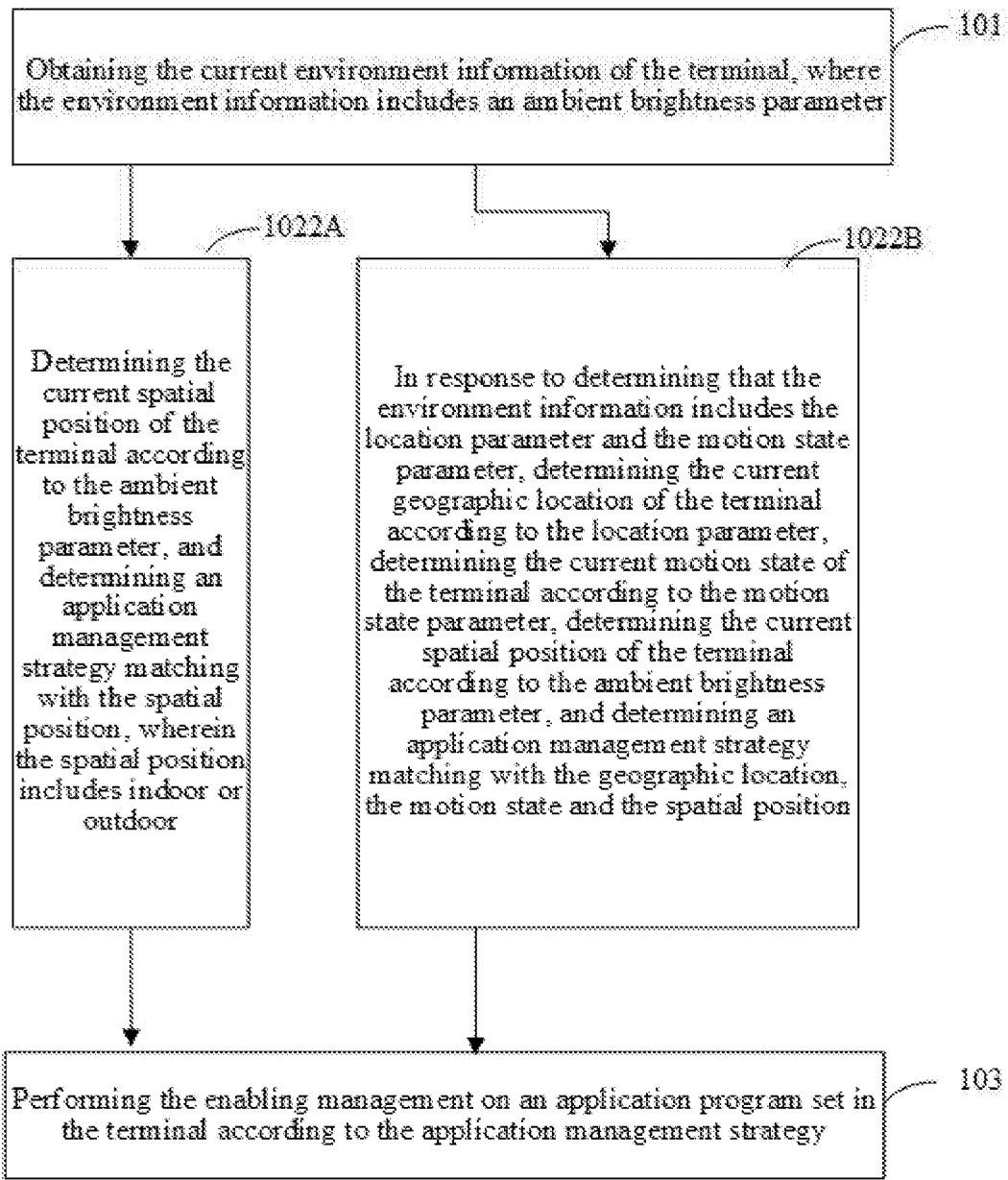
FIG. 7 is another flow schematic diagram of a terminal management method according to an embodiment of the present disclosure.

In an embodiment provided by the present disclosure, as shown in FIG. 7, the environment information may further include an ambient brightness parameter, and the step 102 may further include step 1022A and step 1022B.

In step 1022A, the current spatial position of the terminal is determined according to the ambient brightness parameter, and an application management strategy matching with the spatial position is determined, wherein the spatial position includes indoor or outdoor.

In step 1022B, the current geographic location of the terminal is determined according to the location parameter, the current motion state of the terminal is determined according to the motion state parameter, the current spatial position of the terminal is determined according to the ambient brightness parameter, and an application management strategy matching with the geographic location, the motion state and the spatial position is determined.

For example, if the user is outdoor at night and the mobile phone needs to activate the flashlight function, the environment and the application management strategy may be configured accordingly, where the environment 1 contains the indoor/outdoor state being outdoor, and the application program permitted to be used in the application management strategy 1 corresponding to the environment 1 is flashlight. When the detected light intensity is 10 lux, since the outdoor light intensity is usually greater than 1000 lux during the day and usually less than 100 lux at night, it may be determined that the terminal is outdoor and at night, and it is determined that the user is in the state corresponding to the environment 1, to thereby determine the corresponding application management strategy 1 and enable the application program of the terminal according to the application management strategy 1, where the flashlight function of the terminal is opened.

In an embodiment provided by the present disclosure, the outdoor state may be used as the condition to match the application management strategy, and the terminal automatically enters the enabling management, automatically enables the first target program, and protects the user safety.

In an embodiment provided by the present disclosure, the geographic location of the terminal may be determined by the positioning system, but there may be errors in the positioning accuracy of the positioning system, so it is impossible to accurately determine whether the terminal is indoor or outdoor. Therefore, the ambient brightness parameter of the terminal may be increased for further reference.

In an embodiment provided by the present disclosure, the ambient brightness parameter of the terminal may be obtained by the light sensor of the terminal. When receiving the external light, the light sensor may generate currents with corresponding intensities according to different light intensities, and the currents are converted to the ambient light brightness parameters through the processor ADC function.

For example, in some countries, the functions other than "time and answering call" of the mobile phone are prohibited from being used when walking outdoor, and then the environment and the application management strategy may be configured accordingly, where the environment 1 contains the motion state type being walking, the geographic location being xx city and the spatial position being outdoor, and the application programs permitted to be used in the application management strategy 1 corresponding to the environment 1 include time and answering call, while other application programs are all prohibited from being used. When the detected light intensity is 12000 lux, since the outdoor light intensity is usually greater than 1000 lux during the day and usually less than 100 lux at night, it may be determined that the terminal is outdoor. At the same time, when detecting that the terminal is in the xx city and the motion state is walking, it is determined that the user is in the state corresponding to the environment 1, to thereby determine the corresponding application management strategy 1. According to the application management strategy 1, the terminal can only use the time and answering call functions. The terminal can use not only the location information and motion information but also the ambient brightness information to match the application management strategy. By adding the ambient brightness information, the geographic location of the terminal is further judged precisely, so as to meet the specified requirements, and also improve the accuracy rate of automatically entering the disabled mode of application programs.

Figure 8:
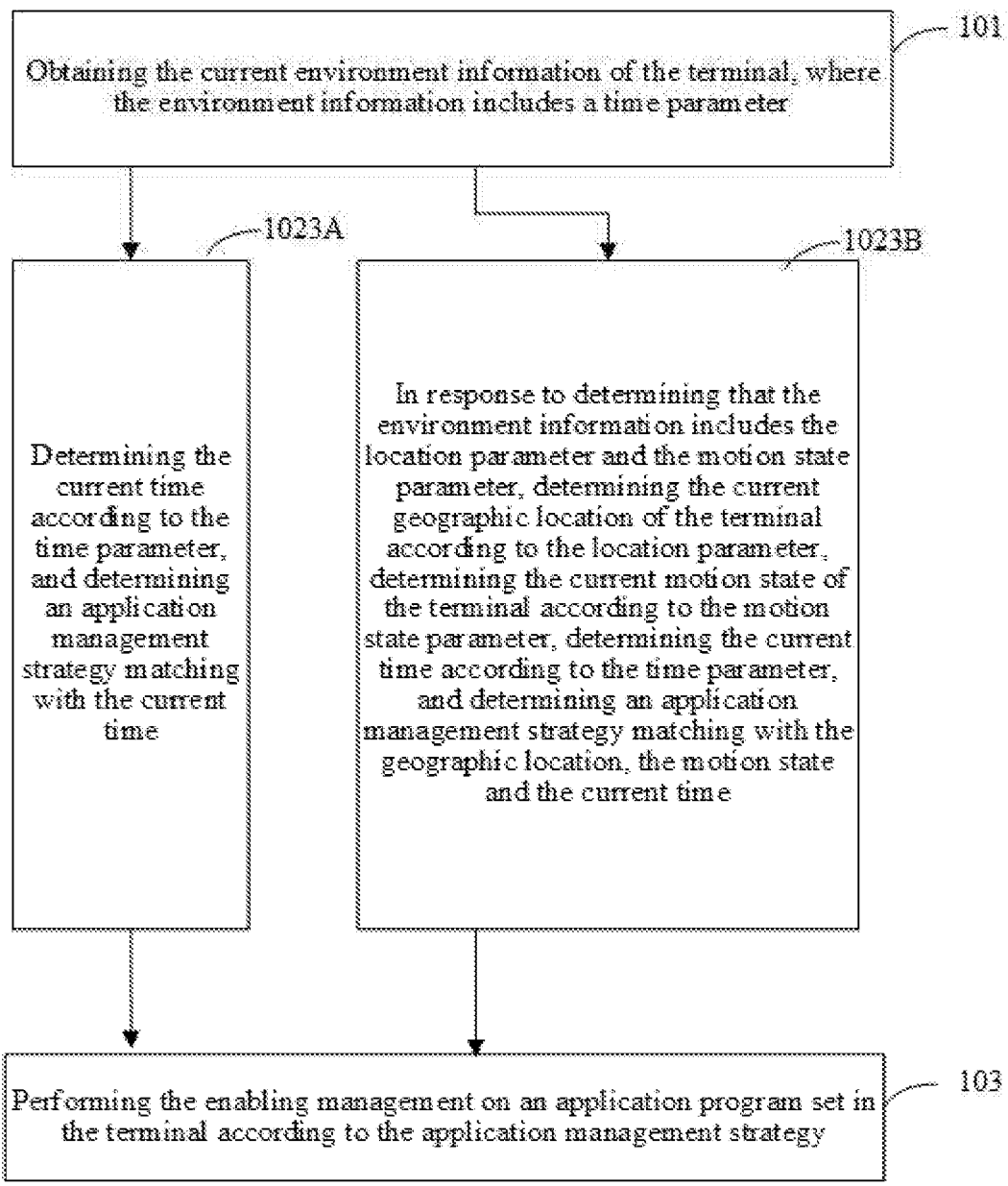
FIG. 8 is yet another flow schematic diagram of a terminal management method according to an embodiment of the present disclosure.

In an embodiment provided by the present disclosure, as shown in FIG. 8, the environment information may further include a time parameter, and accordingly, the step 102 may include step 1023A and step 1023B.

In step 1023A, the current time is determined according to the time parameter, and an application management strategy matching with the current time is determined.

In step 1023B, the current geographic location of the terminal is determined according to the location parameter, the current motion state of the terminal is determined according to the motion state parameter, the current time is determined according to the time parameter, and an application management strategy matching with the geographic location, the motion state and the current time is determined.

The time parameter may be obtained by reading the system time of the terminal and/or querying the Internet time. For example, in order to prevent the user from staying up late to play the mobile phone, it may be stipulated that the user is prohibited from using the entertainment function of the terminal from 22 o'clock in the evening to 6 o'clock in the morning of next day, and the environment 1 representing the sleep state in the environment information and the application management strategy is configured accordingly. The corresponding time parameter in the environment 1 is from 22 o'clock in the evening to 6 o'clock in the morning of next day, and the application programs permitted to be used include time, call and message, while other application programs are all prohibited from being used. When the terminal detects that the time is "23:00", it may determine that the user is in the state corresponding to the environment 1, to thereby determine the corresponding application management strategy 1 and perform the enabling management on the terminal according to the application management strategy 1, so that the terminal can only use the time, call and message functions.

In an embodiment provided by the present disclosure, the time is taken as the preset condition of the application management strategy, so that the terminal can enter the enabling management automatically within the specified time, and the user can get a better rest.

For example, when working in the office, the entertainment function of the mobile phone is prohibited from being used, and the environment 1 representing the working state in the environment information and the application management strategy is configured accordingly. The corresponding motion state parameter in the environment 1 is the stationary state, the geographic location parameter is xx company, and the time parameter is 8:00 to 17:00. The application programs permitted to be used include time, call and message, while other application programs are all prohibited from being used. When the terminal detects that the current location is "xx company", the time is "10:00" and the motion state is "stationary", it may determine that the user is in the state corresponding to the environment 1, to thereby determine the corresponding application management strategy 1. According to the application management strategy 1, the terminal can only use the time, call and message functions.

In an embodiment provided by the present disclosure, the geographic location, the motion state and the time state are used as combined conditions to restrict the use of the terminal, which can reduce the harm caused by the user's long-term use of the terminal. The terminal may obtain the time parameter by reading its own system time and/or querying the Internet time, which is not limited in this embodiment.

Figure 9:
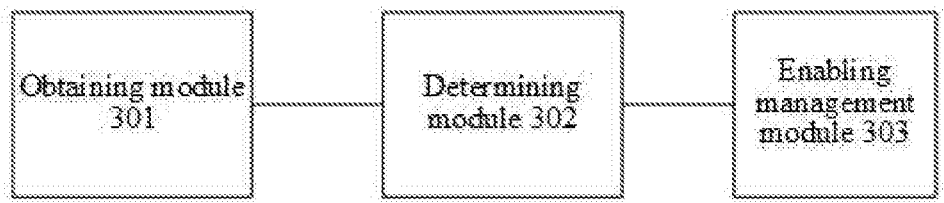
FIG. 9 is a structural schematic diagram of a terminal management device according to an embodiment of the present disclosure.

In an embodiment provided by the present disclosure, a terminal management device is further provided. As shown in FIG. 9, the device may include an obtaining module 301, a determining module 302, and an enabling management module 303.

The obtaining module 301 is configured to obtain the current environment information of a terminal; The determining module 302 is configured to determine an application management strategy matching with the current environment information according to the current environment information and the correspondence between environment information and application management strategies. The enabling management module 303 is configured to perform the enabling management on an application program set in the terminal according to the application management strategy.

In an embodiment provided by the present disclosure, the enabling management module 303 may be further configured to determine that the application program is permitted to be used or prohibited from being used according to the application management strategy.

The enabling management module 303 may be further configured to: in response to determining that the application program is permitted to be used, display the relevant information of the application program in a virtual screen display interface displayed currently by the terminal, wherein the virtual screen display interface is a user interface locked and displayed currently by the terminal; and in response to determining that the application program is prohibited from being used, disable the application program.

In an embodiment provided by the present disclosure, the obtaining module 301 may be configured to obtain the correspondence between environment information and application management strategies sent by an OTA platform.

In an embodiment provided by the present disclosure, the obtaining module 301 may be configured to obtain a configuration instruction for adjusting the correspondence between environment information and application management strategies, where the configuration instruction carries the parameter adjustment information, and the determining module 302 is configured to determine the adjusted correspondence between environment information and application management strategies according to the parameter adjustment information.

In an embodiment provided by the present disclosure, the environment information may include at least one of a location parameter and a motion state parameter, and the determining module 302 may be further configured to: in response to determining that the environment information includes the location parameter, determine the current geographic location of the terminal according to the location parameter, and determine an application management strategy matching with the geographic location; in response to determining that the environment information includes the motion state parameter, determine the current motion state of the terminal according to the motion state parameter, and determine an application management strategy matching with the motion state; and in response to determining that the environment information includes the location parameter and the motion state parameter, determine the current geographic location of the terminal according to the location parameter, determine the current motion state of the terminal according to the motion state parameter, and determine an application management strategy matching with the geographic location and the motion state.

In an embodiment provided by the present disclosure, the environment information may further include an ambient brightness parameter, and the determining module 302 may be further configured to: determine the current spatial position of the terminal according to the ambient brightness parameter, and determine an application management strategy matching with the spatial position, wherein the spatial position includes indoor or outdoor; and in response to determining that the environment information includes the location parameter and the motion state parameter, determine the current geographic location of the terminal according to the location parameter, determine the current motion state of the terminal according to the motion state parameter, determine the current spatial position of the terminal according to the ambient brightness parameter, and determine an application management strategy matching with the geographic location, the motion state and the spatial position.

In an embodiment provided by the present disclosure, the environment information may further include a time parameter, and the determining module 302 may be further configured to: determine the current time according to the time parameter, and determine an application management strategy matching with the current time; and in response to determining that the environment information includes the location parameter and the motion state parameter, determine the current geographic location of the terminal according to the location parameter, determine the current motion state of the terminal according to the motion state parameter, determine the current time according to the time parameter, and determine an application management strategy matching with the geographic location, the motion state and the current time.

Figure 10:
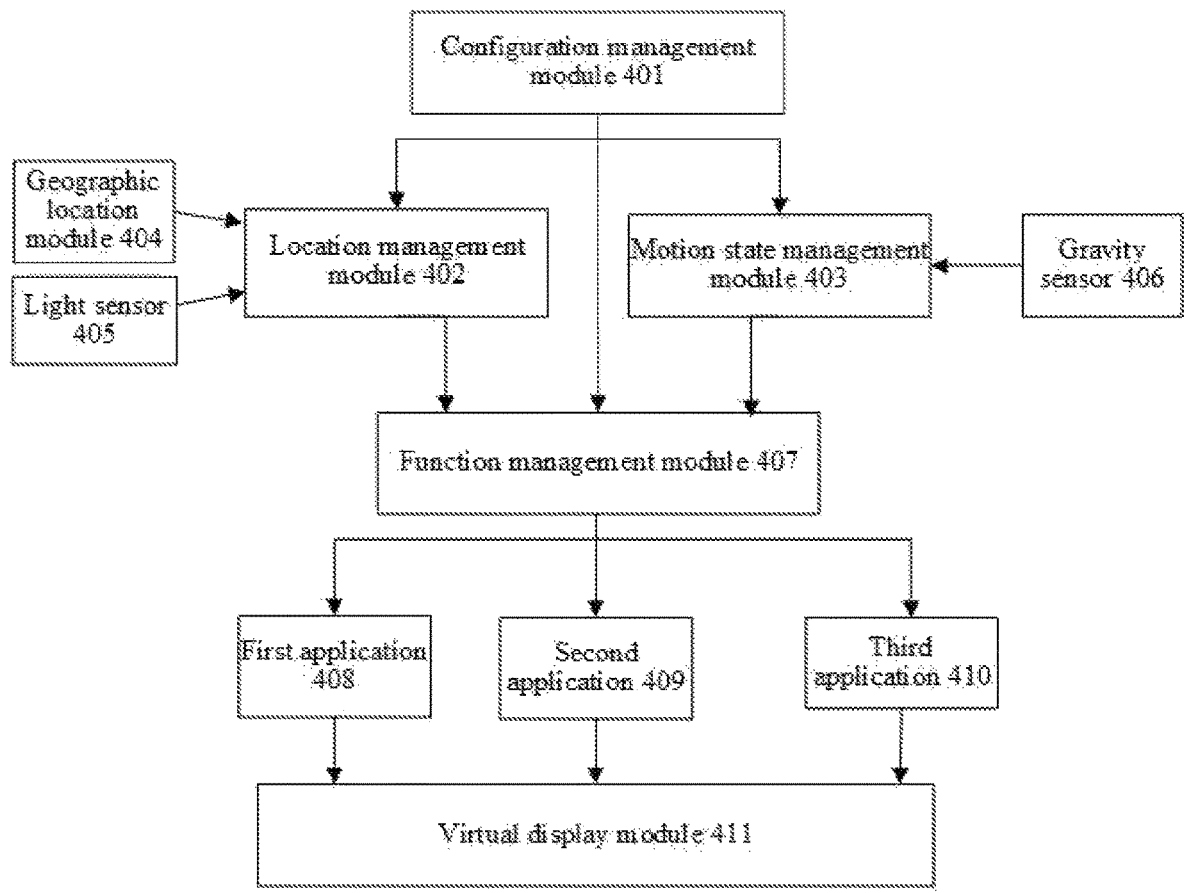
FIG. 10 is another structural schematic diagram of a terminal management device according to an embodiment of the present disclosure.

In an embodiment provided by the present disclosure, another terminal management device is provided. As shown in FIG. 10, the device may include a configuration management module 401, a location management module 402, a geographic location module 404, a light sensor 405, a motion state management module 403, a gravity sensor 406, a function management module 407, a first application 408, a second application 409, a third application 410, and a virtual display module 411.

In an embodiment provided by the present disclosure, the case that some functions of a terminal are disabled when walking outdoor in a city is taken as an example. The configuration management module 401 is configured to obtain the correspondence between environment information and application management strategies. The configuration management module 401 parses the correspondence between environment information and application management strategies correctly, and then sends it to the corresponding location management module 402 and motion state management module 403 for initialization. When the configuration parameter is parsed as the function type, the preset corresponding parameter range is searched and output as the parameter, and when the configuration parameter is parsed as the numeric type, the parameter is directly output to the corresponding module. At the same time, the configuration management module 401 can also configure a whitelist of unrestricted application programs.

The location management module 402 is configured to compare the geographic location parameter obtained by the geographic location module 404 and the ambient brightness parameter obtained by the light sensor 405 with the location parameter issued by the configuration management module, and judge whether the location is within a specified area and/or whether it is outdoor. The geographic location may be combined with the electronic map, etc. When the location parameter is set to a city, the map fence function may be used to query whether the location is within the fence latitude and longitude range. Due to the difference in brightness between indoor and outdoor, it may be judged whether the current location is outdoor by the ambient brightness parameter.

The motion state management module 403 is configured to judge the motion state of the terminal, obtain the motion parameter via the navigation calculation formula by detecting the data of the gravity sensor 406, and judge the current motion state according to the motion parameter, where the judgment method is to classify directly according to the speed or through the machine learning.

The function management module 407 is configured to judge whether the location information and the motion state parameter of the terminal match with the application management strategy, and if so, start the function limitation, and output only the first application 408, the second application 409 and the third application 410 in the unrestricted whitelist of the application management strategy.

The virtual display module 411 is configured to display a virtual interface on the current interface of the terminal when entering the application program disable mode, where the virtual interface displays the information about the unrestricted application programs in the application management strategy. In addition, it may further display "functions are restricted" and other prompt information.

In order to be able to understand the application program management method in the embodiments of the present application, the application program management method implemented on the terminal is illustrated in detail by taking the case of stipulating that the people are prohibited from using the application program functions other than time and answering call on the terminal when walking outdoors in the city A as an example.

The terminal obtains the correspondence between environment information and application management strategies configured by the operator or security agency and issued by the OTA platform. After the terminal receives the configuration information, the configuration management module 401 parses the received information, for example, the configuration parameter is function type, the geographic location is city A, the environment is outdoor, and the motion state is slow walking. In another example, the configuration parameter is numeric type, the geographic location is the central electronic fence (latitude and longitude) of the city A, the environment is greater than 1200 lux or less than 80 lux, and the moving speed is 0.1 m/s-10 m/s.

The configuration management module 401 needs to perform the content analysis on the geographic location value. If it is the function type, it is converted to the map interface according to the city name (place name), the geographic location is associated with the map information to obtain the geographic latitude and longitude of the corresponding city A, and the electronic fence data is formed to be sent to the location management module 402 for processing; if it is the numeric type, the read parameter range is directly sent to the location management module 402 for processing.

The configuration management module 401 may perform the content analysis on the light value. If it is the function type, the parameter value corresponding to the brightness state value is queried in the local database, and the corresponding range value is sent to the location management module 402; if it is the numeric type, the parameter range is sent to the location management module 402.

The configuration management module 401 may perform the content analysis on the state value. If it is the function type, the parameter value corresponding to the motion state value is queried in the local database, and the corresponding range value is sent to the motion management module 403; if it is the numeric type, the parameter range is sent to the motion management module 403.

The location management module 402 obtains the latitude and longitude information of the current location through GPS, etc., compares it with the location latitude and longitude information (electronic fence data) input by the configuration management module 401, judges whether the current location point is within the restricted range, and if so, outputs the signal identification bit of which the geographical location is "true".

The location management module 402 judges whether the current position is outdoor through the intensity value of the light brightness output by the light sensor 405. If it is outdoor, the location module 402 outputs the signal identification bit of which the outdoor information is "true".

The motion state management module 403 calculates the current motion speed by using the gravity sensor 406 in combination with the GPS information, and compares it with the motion speed range provided by the configuration management module 401. If the current motion speed is within the limited range, the motion state management module 403 outputs the signal identification bit being "true".

If the identification bits of the geographic location, outdoor information and motion state are all "true", that is, the condition of restricted function is met, the function management module 407 activates the restricted function, where only the functions in the whitelist of unrestricted application programs can be used. The whitelist of unrestricted application programs may be configured by the OTA platform or may be preset by factory. If the configuration information received by the configuration management module 401 contains the whitelist of unrestricted application programs, the configuration management module 401 parses the configuration parameters into the corresponding function array and sends it to the function management module 407; otherwise, the configuration management module 401 searches for the whitelist array of unrestricted application programs in the local database and sends it to the function management module 407.

The terminal will start the display mode of limited management, in which a virtual screen display interface may be displayed through a part of the ordinary screen for displaying the time, incoming call, dial pad, etc.; and the user prompt information may also be displayed, such as "functions are restricted, pay attention to safety", "prohibit from looking at phone when walking in *** area" and other information.

In the above example, the terminal obtains the application management strategy through the configuration management module 401, and compares the geographic location, light intensity, and motion state with the preset conditions in the application management strategy through the location management module 402 and the motion state management module 403. If the preset conditions in the application management strategy are met, the terminal management module 407 turns on the enabling function and activates the unrestricted application functions, and the related information of the unrestricted application functions is displayed on the virtual display module 411. Through this application management device, in the particular environment, the terminal can enter the enable mode automatically, thereby using the terminal reasonably and reducing the power consumption of the terminal.

Figure 11:
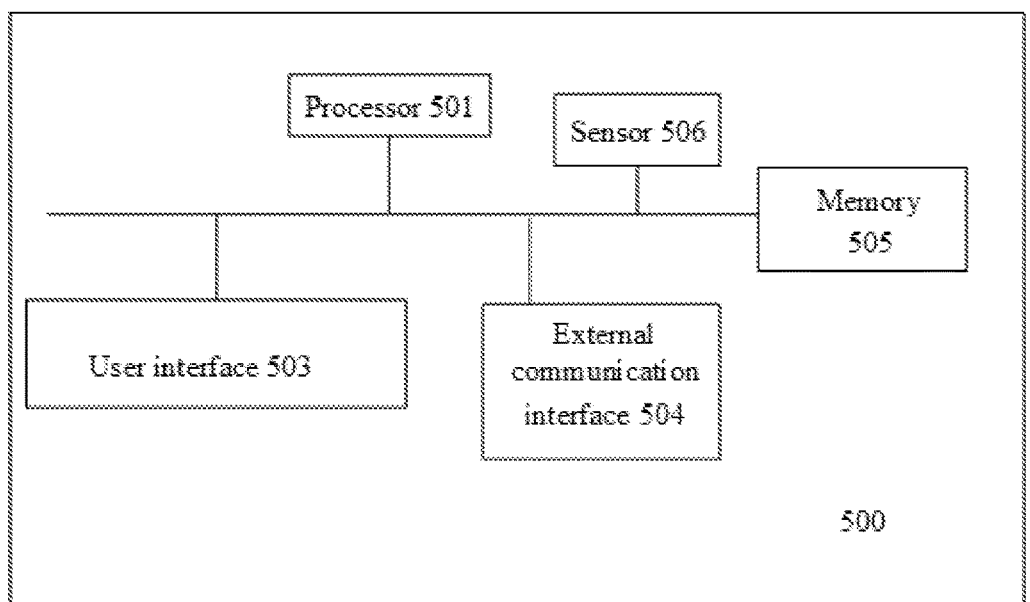
FIG. 11 is a structural schematic diagram of a terminal according to an embodiment of the present disclosure.

In an embodiment provided by the present disclosure, a terminal is further provided. As shown in FIG. 11, the terminal 500 includes at least one processor 501 and at least one memory 505. The memory 505 includes a computer program that can be run on the processor 501. The processor 501 may perform the terminal management method according to various embodiments of the present disclosure when running the computer program.

In an embodiment provided by the present disclosure, a computer storage medium is further provided, where the computer storage medium stores a computer program thereon, and when the computer program is executed by a processor, the processor performs the terminal management method according to various embodiments of the present disclosure.

Unless otherwise defined, all the technical and scientific terms used herein have the same meaning as commonly understood by those skilled in the technical field of the present disclosure. The terms used in the specification of the present disclosure herein is only for the purpose of describing specific embodiments, and is not intended to limit the present disclosure. The term "and/or" as used herein includes any and all combinations of one or more relevant listed items.

It may be understood by those ordinary skilled in the art that the functional modules/units in all or some of the steps, systems, and devices in the methods disclosed above may be implemented as the software, firmware, hardware and the suitable combination thereof.

In the hardware embodiments, the division among the functional modules/units mentioned in the above description does not necessarily correspond to the division of the physical components; for example, one physical component may have multiple functions, or one function or step may be performed jointly by several physical components. Some or all physical components may be implemented as the software executed by a processor such as central processing unit, digital signal processor or microprocessor, or implemented as the hardware, or implemented as an integrated circuit such as application specific integrated circuit. Such softwares may be distributed over the computer readable media which may include the computer storage medium (or non-transient medium). As can be well known by those ordinary skilled in the art, the term "computer storage medium" includes the volatile, non-volatile, removable and unremovable media implemented in any method or technique for storing the information (such as computer readable instructions, data structures, program modules, or other data). The computer storage medium includes but not limited to RAM, ROM, EEPROM, flash or other memory technology, CD-ROM, Digital Versatile Disc (DVD) or other optical disc storage, magnetic box, magnetic tape, magnetic disk storage or other magnetic storage device, or any other medium which can be used to store the desired information and can be accessed by a computer.

The above description is only the specific embodiments of the present disclosure, but the protection scope of the present disclosure is not limited to this. The changes or replacements that any person skilled in the art can easily think of within the technical scope disclosed in the present disclosure should be encompassed within the protection scope of the present disclosure. The protection scope of the present disclosure should be subject to the protection scope of the claims.

What is claimed is:

1. A terminal management method, comprising:
obtaining current environment information of a terminal;
determining an application management strategy matching with the current environment information according to the current environment information and a correspondence between environment information and application management strategies; and
performing an enabling management on an application program set in the terminal according to the application management strategy;
wherein the environment information comprises at least one of a location parameter and a motion state parameter; and
the step of determining an application management strategy matching with the current environment information according to the current environment information and a correspondence between environment information and application management strategies comprises:
in response to determining that the environment information comprises the location parameter, determining a current geographic location of the terminal according to the location parameter, and determining an application management strategy matching with the geographic location;
in response to determining that the environment information comprises the motion state parameter, determining a current motion state of the terminal according to the motion state parameter, and determining an application management strategy matching with the motion state; and
in response to determining that the environment information comprises the location parameter and the motion state parameter, determining a current geographic location of the terminal according to the location parameter, determining a current motion state of the terminal according to the motion state parameter, and determining an application management strategy matching with the geographic location and the motion state.

2. The terminal management method according to claim 1, wherein the step of performing an enabling management on an application program set in the terminal according to the application management strategy comprises:
determining that the application program is permitted to be used or prohibited from being used according to the application management strategy.

3. The terminal management method according to claim 2, wherein the step of performing an enabling management on an application program set in the terminal according to the application management strategy further comprises:
in response to determining that the application program is permitted to be used, displaying relevant information of the application program in a virtual screen display interface displayed currently by the terminal, wherein the virtual screen display interface is a user interface locked and displayed currently by the terminal; and
in response to determining that the application program is prohibited from being used, disabling the application program.

4. The terminal management method according to claim 1, wherein before the step of determining an application management strategy matching with the current environment information, the method further comprises:
obtaining the correspondence between environment information and application management strategies sent by an Over The Air (OTA) platform.

5. The terminal management method according to claim 1, wherein before the step of determining an application management strategy matching with the current environment information, the method further comprises:
obtaining a configuration instruction for adjusting the correspondence between environment information and application management strategies, the configuration instruction carrying parameter adjustment information; and
determining an adjusted correspondence between environment information and application management strategies according to the parameter adjustment information.

6. The terminal management method according to claim 1, wherein the environment information further comprises an ambient brightness parameter, and the step of determining an application management strategy matching with the current environment information according to the current environment information and a correspondence between environment information and application management strategies comprises:
determining a current spatial position of the terminal according to the ambient brightness parameter, and determining an application management strategy matching with the spatial position, wherein the spatial position comprises indoor or outdoor; and
in response to determining that the environment information comprises the location parameter and the motion state parameter, determining a current geographic location of the terminal according to the location parameter, determining a current motion state of the terminal according to the motion state parameter, determining a current spatial position of the terminal according to the ambient brightness parameter, and determining an application management strategy matching with the geographic location, the motion state and the spatial position.

7. The terminal management method according to claim 1, wherein the environment information further comprises a time parameter, and the step of determining an application management strategy matching with the current environment information according to the current environment information and a correspondence between environment information and application management strategies comprises:
determining current time according to the time parameter, and determining an application management strategy matching with the current time; and
in response to determining that the environment information comprises the location parameter and the motion state parameter, determining a current geographic location of the terminal according to the location parameter, determining a current motion state of the terminal according to the motion state parameter, determining current time according to the time parameter, and determining an application management strategy matching with the geographic location, the motion state and the current time.

8. A terminal, comprising:
a processor, and
a memory for storing a computer program runnable on the processor, wherein when running the computer program, the processor performs a method comprising:
obtaining current environment information of the terminal;
determining an application management strategy matching with the current environment information according to the current environment information and a correspondence between environment information and application management strategies; and performing an enabling management on an application program set in the terminal according to the application management strategy;

wherein the environment information comprises at least one of a location parameter and a motion state parameter; and when running the computer program, the processor performs:

in response to determining that the environment information comprises the location parameter, determining a current geographic location of the terminal according to the location parameter, and determining an application management strategy matching with the geographic location;

in response to determining that the environment information comprises the motion state parameter, determining a current motion state of the terminal according to the motion state parameter, and determining an application management strategy matching with the motion state; and in response to determining that the environment information comprises the location parameter and the motion state parameter, determining a current geographic location of the terminal according to the location parameter, determining a current motion state of the terminal according to the motion state parameter, and determining an application management strategy matching with the geographic location and the motion state.

9. A non-transitory computer-readable storage medium storing instructions which, when executed by a processor, cause the processor to perform the terminal management method according to claim 1.

10. The terminal according to claim 8, wherein when running the computer program, the processor performs:

determining that the application program is permitted to be used or prohibited from being used according to the application management strategy.

11. The terminal according to claim 10, wherein when running the computer program, the processor performs:

in response to determining that the application program is permitted to be used, displaying relevant information of the application program in a virtual screen display interface displayed currently by the terminal, wherein the virtual screen display interface is a user interface locked and displayed currently by the terminal; and in response to determining that the application program is prohibited from being used, disabling the application program.

12. The terminal according to claim 8, wherein before determining the application management strategy matching with the current environment information, the processor performs:

obtaining the correspondence between environment information and application management strategies sent by an Over The Air (OTA) platform.

13. The terminal according to claim 8, wherein before determining the application management strategy matching with the current environment information, the processor performs:

obtaining a configuration instruction for adjusting the correspondence between environment information and application management strategies, the configuration instruction carrying parameter adjustment information; and determining an adjusted correspondence between environment information and application management strategies according to the parameter adjustment information.

14. The terminal according to claim 8, wherein the environment information further comprises an ambient brightness parameter, and when running the computer program, the processor performs:

determining a current spatial position of the terminal according to the ambient brightness parameter, and determining an application management strategy matching with the spatial position, wherein the spatial position comprises indoor or outdoor; and in response to determining that the environment information comprises the location parameter and the motion state parameter, determining a current geographic location of the terminal according to the location parameter, determining a current motion state of the terminal according to the motion state parameter, determining a current spatial position of the terminal according to the ambient brightness parameter, and determining an application management strategy matching with the geographic location, the motion state and the spatial position.

15. The terminal according to claim 8, wherein the environment information further comprises a time parameter, and when running the computer program, the processor performs:

determining current time according to the time parameter, and determining an application management strategy matching with the current time; and in response to determining that the environment information comprises the location parameter and the motion state parameter, determining a current geographic location of the terminal according to the location parameter, determining a current motion state of the terminal according to the motion state parameter, determining current time according to the time parameter, and determining an application management strategy matching with the geographic location, the motion state and the current time.

* * * * *